Dec. 17, 1957  M. W. MUEHTER  2,817,075
REMOTE TESTING CIRCUIT
Filed Oct. 29, 1954
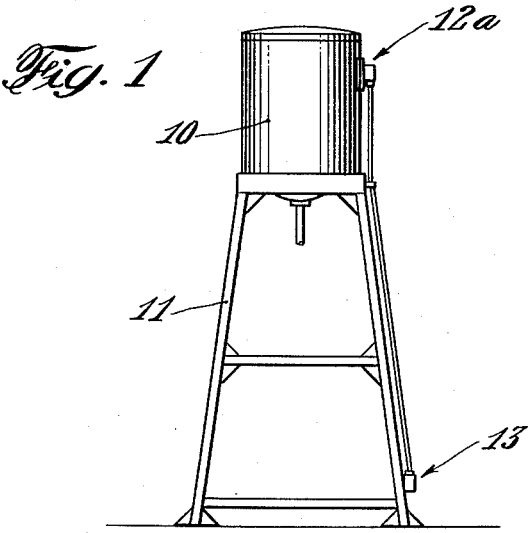
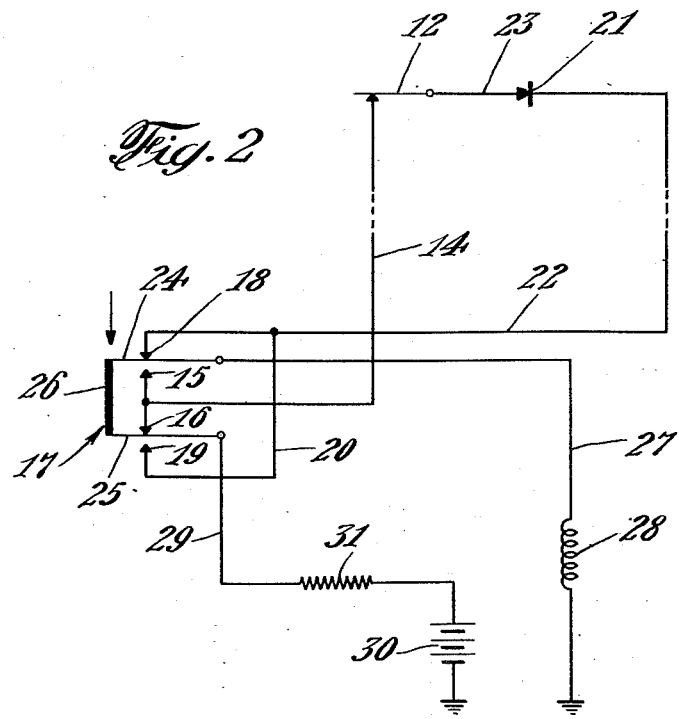

United States Patent Office 2,817,075
Patented Dec. 17, 1957

2,817,075

REMOTE TESTING CIRCUIT

Manfred W. Muehter, Nutley, N. J., assignor to American District Telegraph Company, Jersey City, N. J., a corporation of New Jersey Application October 29, 1954, Serial No. 465,621

2 Claims. (Cl. 340—214)

My present invention relates to test circuits and more particularly to a test circuit for determining the condition of a normally closed alarm circuit which when opened initiates the transmission of an alarm signal and is especially well suited for use with a water storage tank thermostat alarm circuit.

Water storage tanks of the gravity flow type are usually located on relatively high structures above ground level and are equipped with a thermostat circuit including a transmitter for initiating an alarm signal and a thermostat switch located in heat exchange relationship with the water in the tank. In order to provide fail-safe operation the thermostat switch, transmitter and power supply are connected in series and the thermostat is adjusted to open its switch on the occurrence of either a hazardously high or low water temperature. Failures, as for example a power failure, result in the transmission of an alarm signal since, as in the case of the opening of the thermostat switch, current flow through the transmitter is interrupted which occurrence initiates the transmission of the alarm signal.

During the normal course of events, it is necessary periodically to inspect the thermostat circuit to insure that a short circuit has not occurred, by-passing the thermostat switch, thereby connecting the transmitter directly to the power supply. Heretofore, such a test has been accomplished by a workman climbing to the top of the support or tower and manually opening the thermostat switch. As a consequence some danger normally was involved in effecting the test. When conditions were such as to shift the water temperature to either extreme thereby making it imperative that the tests be carried out they also tended to aggravate the difficulties of carrying out the test.

It has been proposed to provide a separate test circuit paralleling the existing thermostat circuit. However, this would have required the provision of one or more additional leads extending from the water storage tank to the base of the tower accompanied by its own chances of failure as well as substantial installation and maintenance costs.

It is therefore a principal object of this invention to provide circuit means for testing a normally closed circuit having a switch responsive to a variable condition which circuit means are operable to simulate the switch in its open position electrically without altering the switch from its normally closed position.

Another object is to provide circuit means for testing the thermostat circuit of a gravity flow water storage tank which may be readily installed and utilized and which is operable from a position remote from the temperature sensitive switch.

In accordance with my invention I provide a rectifier which passes current in only one direction physically close to and on one side of the temperature responsive thermostat switch of a water storage tank thermostat circuit which also includes in series relation with the switch a direct current power supply and the winding of a transmitter relay or other suitable device for controlling the initiation of an alarm signal. Switch means are provided remote from the thermostat and in a convenient location for reversing the flow of current through the series rectifier which in blocking the flow of current simulates the thermostat switch in its open condition. Under normal conditions the transmitter winding is maintained energized and the thermostat switch is closed. When the switch means is actuated to reverse the flow of current the transmitter winding becomes deenergized and its relay drops out indicating that the thermostat circuit is operative.

Further objects and advantages of my invention will be apparent from the following description thereof and the drawings in which:

Figure 1 is an elevational view of an installation in accordance with the present invention on one type of gravity flow water storage tank; and Figure 2 is a diagram of the circuit thereof.

Referring now to the drawings in detail, a gravity flow water tank installation may include a water storage tank 10 supported on a tower 11. Tower 11 may be supported on the ground or as is usually the case it may be supported atop a structure, the water being intended as a safeguard against fire. It will be readily appreciated that extreme weather conditions such as cold which may result in the water freezing would render the system inoperative and might even seriously damage it. For this, as well as other reasons, it has been customary to utilize a thermostat circuit having a thermostat or temperature responsive switch 12 having a housing indicated at 12a in Figure 1. Switch 12 is in heat exchange relationship with the water in tank 10 and between a power supply and a transmitter indicated at 13 (Figure 1) for initiating an alarm signal. Thermostat switch 12 is normally closed and is set to open when the temperature of the water falls below or rises above certain predetermined hazardous values.

One side of thermostat switch 12 is connected by lead 14 to coupled contacts 15 and 16 of a switch means 17 in the form of two coupled two position switches. The remaining contacts 18 and 19 are coupled by lead 20 and connected through rectifier 21 by leads 22, 23 to the opposite side of thermostat switch 12. Rectifier 21 may be a germanium diode positioned physically close to switch 12 and may be mounted in housing 12a. Poles 24, 25 of switch means 17 are mutually insulated and actuated by a push button 26. Pole 24 is connected by lead 27 to a winding 28 of a transmitter relay (not shown) while pole 25 is connected by lead 29 to the positive side of a direct current source indicated by battery 30 the other side of which is connected to winding 28 through ground. Lead 29 may include a suitable resistor 31 as indicated.

As previously indicated thermostat switch 12 is closed under normal conditions and current flows from battery 30 along lead 29 to pole 25 of switch means 17, the latter normally being biased to its raised position against contact 16 as shown in Figure 2. The current flows through contact 16 and lead 14 to one side of thermostat switch 12 which being closed passes the current through lead 23 to diode rectifier 21, the positive side of which is connected to lead 23 thereby permitting the current to pass to lead 22, contact 18, raised pole 24, lead 27, to winding 28 and then to ground.

Switch means 17 is conveniently located at the position 13 indicated in Figure 1 close by the transmitting device and remote from thermostat switch 12. When it is desired to initiate a test of the thermostat circuit, push button 26 may be manually actuated to lower poles 24, 25 connecting them respectively with contacts 15 and 19. Now the positive side of battery 30 is connected through contact 19 and leads 20, 22 to the negative side of diode rectifier 21. The negative side of battery 30 is connected through ground, winding 28, lead 27, pole 24 in its lower positions, contact 15, lead 14, closed switch 12 and lead 23 to the positive side of diode rectifier 21. Since the voltage of battery 30 is selected so that it is well below the inverse breakdown potential of the rectifier, current does not pass and a condition simulating the opening of thermostat switch 12 is created. Consequently, with rectifier 21 physically close to thermostat switch 12, if winding 28 does not become deenergized, signalled by the dropping out of its relay, a short circuit is indicated and the necessary repairs are carried out.

When it is desired to carry out the test without actually transmitting an alarm signal over the signal circuit (not shown) connecting the transmitter with a central supervisory station a suitable bypass may be provided for use by the testing personnel and also conveniently located at position 13.

It will be observed that the test installation is carried out without requiring the provision of additional leads between source 30 and winding 28 on the one hand and thermostat switch 12 on the other. Furthermore, the complete test operation may now be accomplished at position 13 at the foot of tower 11, it no longer being required that the testing personnel climb to the top of water tank 10 to operate thermostat switch 12.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. In a thermostat circuit for a gravity flow liquid storage tank, a normally closed thermostat switch on said tank in heat exchange relation with the contents thereof, a source of unidirectional current and means adapted for initiating a signal on the interruption of the flow of current therethrough when said thermostat switch is opened all connected in series relation, voltage responsive impedance means adapted for passing current flowing in one direction and presenting a high impedance to current flowing in the opposite direction positioned physically close to said thermostat switch and in series with said thermostat switch, said source and said first mentioned means, and switch means physically remote from said thermostat switch and interposed in said circuit with said source and first mentioned means on one side thereof and said thermostat switch and impedance means on the other side thereof for reversing the connection of said impedance means across said source, said switch means normally being in position connecting said voltage responsive means in conductive relation across said source, whereby current normally flows through said circuit in one direction and said circuit is tested for abnormalities by actuating said switch means to reverse the connection of said voltage responsive means across said source while said thermostat switch is closed.

2. In a thermostat circuit for a gravity flow liquid storage tank supported in an elevated position, a normally closed thermostat switch on said tank in heat exchange relation with the contents thereof, a source of unidirectional current, signal initiating means connected in series with said source and said thermostat switch, said signal initiating means being adapted for initiating a signal on the interruption of the flow of current therethrough when said thermostat switch is opened, a diode rectifier adapted to pass current only in one direction positioned close to said thermostat switch and connected in series with said thermostat switch, said source and said signal initiating means, and two coupled two position switch means remote from said thermostat switch and connected in said circuit between said source and said signal initiating means on one side thereof and said thermostat switch and said diode rectifier on the other side thereof for reversing the connection of said diode rectifier across said source, said switch means normally being in position connecting said diode rectifier in conductive relation across said source, whereby said circuit is tested for abnormalities by actuating said switch means to its other position and reversing the connection of said diode rectifier across said source while said thermostat switch is closed.

References Cited in the file of this patent

UNITED STATES PATENTS

| 2,052,057 | Reid | Aug. 25, 1936 |
| 2,663,862 | De Anthony | Dec. 22, 1953 |
| 2,696,603 | Ekman | Dec. 7, 1954 |